Feb. 2, 1965  W. M. STELTER  3,168,085
CARBURETION OPTIMIZATION STRUCTURE
Filed June 26, 1963  2 Sheets-Sheet 2
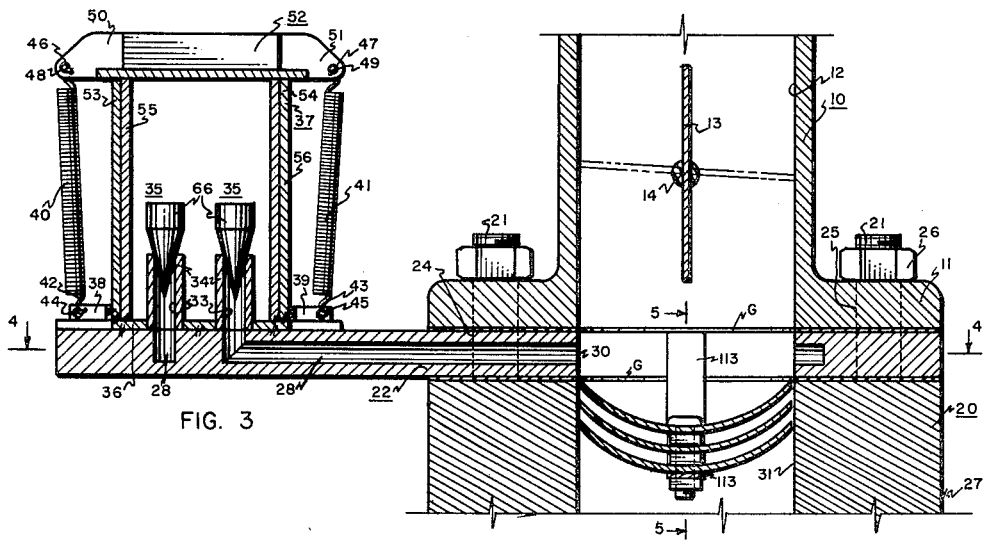
FIG. 3
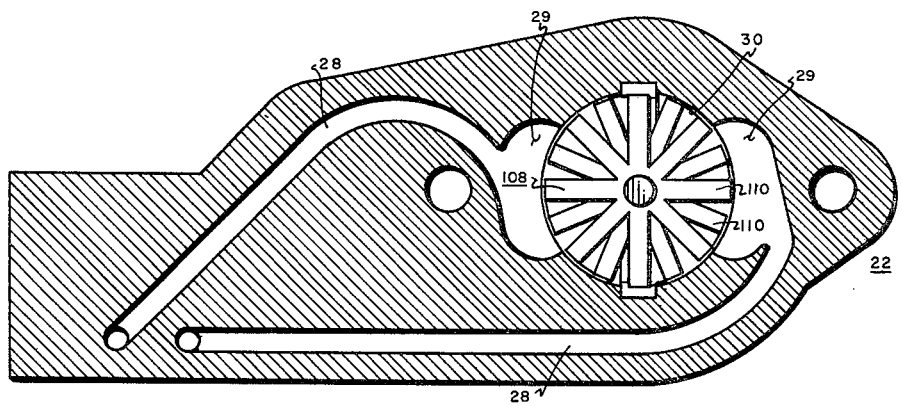
FIG. 4
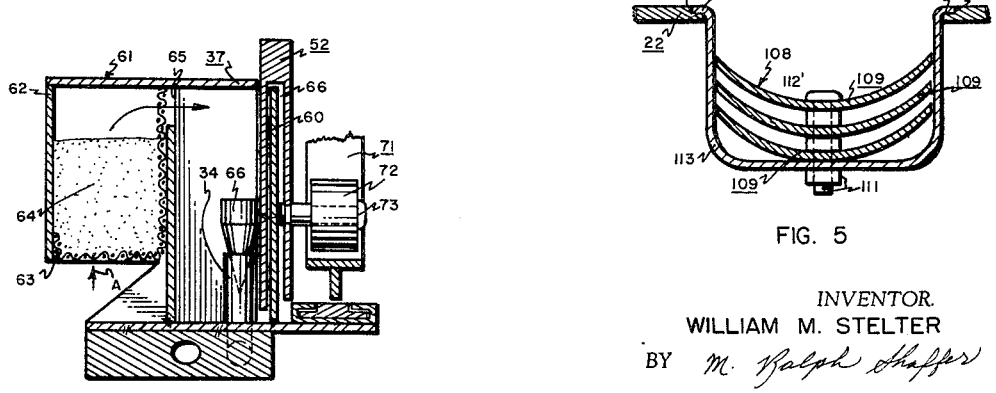
FIG. 5
FIG. 6
INVENTOR.
WILLIAM M. STELTER
BY M. Ralph Shaffer
HIS ATTORNEY

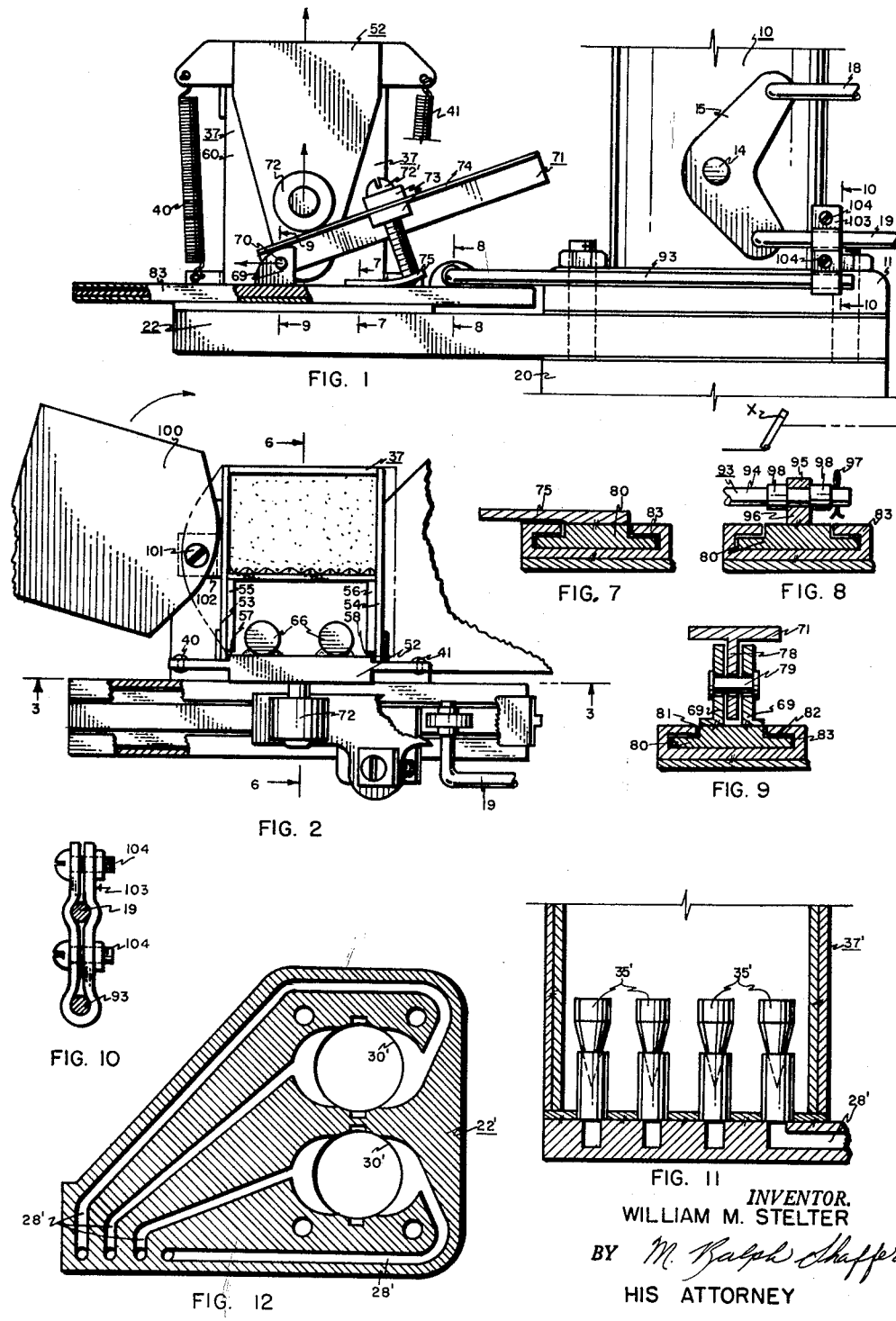

United States Patent Office 3,168,085
Patented Feb. 2, 1965

3,168,085
CARBURETION OPTIMIZATION STRUCTURE
William M. Stelter, 1772 East 70th South,
Salt Lake City 17, Utah
Filed June 26, 1963, Ser. No. 290,830
6 Claims. (Cl. 123—141)

The present invention relates to internal combustion engines and, more particularly, to structural means which may advantageously be incorporated in an engine between the carburetor and intake manifold whereby increased atomization and vaporization of the fuel-air and raw gas mixture coming from the carburetor is increased, thereby to increase the efficiency of effective carburetion and, hence, efficiency of combustion.

In the past, a number of different types of structures have been devised for insertion in the fuel-air path leading from the carburetor to an engine's intake manifold for aiding homogeneity in the fuel-air mixture, and particularly in breaking up raw gas as remains unvaporized after the same passes the carburetor so as to reduce substantially the ratio of raw gas to the vaporized fuel-air mixture and thereby increase efficiency of combustion and markedly reducing the burning of raw gas in the engine proper. Prior devices have included propellers and screens mounted in or proximate to the intake manifold of the engine. Screens deteriorate rapidly and ultimately will be sucked into the engine. This has often happened in the past. Propellers, when used, are inadequate since lubrication of the journals thereof cannot be sustained in the presence of a severe drying effect imposed thereon by the fuel-air mixture as it rushes past into the engine.

The inventor, through repeated experimentation, has arrived at a deflection structure, suitable for insertion between the carburetor and intake manifold, which through its displaced elements does not significantly restrict the throat of the fuel-air passageway but does offer pluralities of tortuous paths for the fuel-air, raw gas mixture so that raw gas will be broken up and vaporized to a great extent. This deflection structure is in itself important and may be used to increase fuel vaporization from a presently achieved figure of approximately 35% to a substantially greater percentage.

The inventor has further found that when more gas is thus vaporized in the carburetion process, additional air is needed. This additional air requirement is generally far beyond that which conventional carburetors are capable of supplying. Of course, other carburetors could be engineered so that their air and fuel intake openings could be metered in a manner as to utilize to a fuller extent the increased vaporization realized through employment of the inventor's deflection structure. However, in order that present carburetor structures may be retained, the inventor has devised a simple, inexpensively manufactured, yet convenient and highly reliable auxiliary air injection system, easily insertable between the carburetor and intake manifold and above the deflection structure previously mentioned so that additional air is supplied the fuel air mixture, thereby accommodating the beneficial effects of deflection structure inclusion. Thus, the needed additional air is supplied the increasingly atomized and vaporized fuel so that fuel consumption is substantially reduced and obtained power substantially increased.

Accordingly, a principal object of the present invention is to provide a structure for increasing the efficiency of effective carburetion in an internal combustion engine.

A further object of the present invention is to provide suitable deflection structure for interposition between the carburetor and intake manifold of an engine so as to increase the homogeneity of the fuel-air mixture and especially to break up droplets and other liquid accumulations of raw gas so that increased vaporizations of fuel is obtained before entrance into the intake manifold of the engine.

A further object of the invention is to provide suitable structure for increased effective carburetion and optimizing the character of the fuel-air mixture entering into the engine, while at the same time accommodating conventional carburetors, by supplying a simple and yet convenient auxiliary air injection system so that an optimized fuel-air mixture is obtained, with the additional quantity of air injection making fullest use of the additional vaporization produced.

A further object of the invention is to provide suitable structure for increasing effective carburetion and supplying auxiliary air to take advantage thereof, this wherein the air delivered to the fuel-air passageway between the carburetor and intake manifold is distributed along spaced areas of communication so that an efficient manner of mixing the added air with the atomized fuel thereat takes place.

Another object is to provide a new and improved air injection system for internal combustion engines.

A further object is to provide air injection structure which may be directly coupled for reciprocative movement to the accelerator rod of the vehicle to the accelerator rod of the engine, thereby reducing mechanical linkage to a minimum.

A further object is to provide a new and improved air injection system for internal combustion engines wherein auxiliary air is introduced between the carburetor and the intake manifold of an internal combustion engine for reducing the fuel air mixture ratio while at the same time insuring maximum homogeneity of the mixture, thereby increasing the efficiency of the engine.

A further object is to provide an auxiliary air injection structure wherein appropriate metering valves are used such that progressive displacement thereof will effect progressive incremental increases in volume of air introduced into the overall system.

A further object is to provide a valve metering, cam and cam ramp structure in an auxiliary air injection system which by its simplicity of construction will be of low cost to manufacture and of a nature adapted for direct coupling to the accelerator rod of the engine.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a front elevation, partially shown in fragmentary view, of the carburetor of an internal combustion engine and auxiliary structure when incorporating auxiliary air injection structure in accordance with the present invention.

FIGURE 2 is a fragmentary top plan of a major portion of the air injection structure of FIGURE 1.

FIGURE 3 is a sectional view taken along the line 3—3 in FIGURE 2, with certain structure removed for purposes of clarity.

FIGURE 4 is a horizontal section taken along the longitudinal plane and is taken along the line 4—4 in FIGURE 1, showing in detail the illustration of the passage plate used in the invention.

FIGURE 5 is a sectional view taken along the line 5—5 in FIGURE 1, showing in section the fuel-air deflection mixer structure utilized in a preferred practice of the invention.

FIGURE 6 is a fragmentary sectional view taken along the line 6—6 in FIGURE 2.

FIGURE 7 is an enlarged section taken along the line 7—7 in FIGURE 1.

FIGURE 8 is an enlarged, fragmentary view, principally in section, taken along the line 8—8 in FIGURE 1.

FIGURE 9 is an enlarged section taken along the line 9—9 in FIGURE 1.

FIGURE 10 is an enlarged vertical section taken along the line 10—10 in FIGURE 1.

FIGURE 11 is an enlarged fragmentary section view, similar in form to the left hand portion in FIGURE 3, indicating that the invention may be practiced with plural barrel carburetor systems.

FIGURE 12 is a passage plate which is a companion to the structure of FIGURE 11 and is similar to FIGURE 4, the former accommodating plural barrel carburetor systems and the latter a single barrel carburetor.

In FIGURES 1–4 carburetor 10 is conventional and is provided with mounting flange 11, an internal bore 12, and a butterfly valve 13 disposed within the latter and journaled for conventional movement by butterfly pivot shaft 14. Keyed to pivot shaft 14 is a lever member 15, also of conventional design, to which are affixed rods 18 and 19, the former leading to the passing control mechanism of an automatic transmission (not shown) and the latter constituting an accelerator rod and to be referred to hereinafter as such. Intake manifold 20 includes conventional upstanding studs 21 which receive the carburetor flange 11 and a certain passage plate 22 disposed therebetween and provided with suitable apertures 24 to accommodate mounting studs 21. Flange 11 is likewise provided with peripheral mounting apertures 25 for the studs 21. Nuts 26 secure the carburetor flange 11 and the passage plate 22 in place such that the passage plate is immediately disposed between the carburetor 10 and intake manifold 20 of the internal combustion engine 27. Passage plate 22 may be constructed in any one of several manners as, for example, by a laminate construction of sandwich configuration wherein the "filler" is provided with suitable slots for accommodating passageways 28. For convenience of illustration, the passageways 28 are merely indicated as central apertures or bores, see FIGURES 3 and 4, which communicate with admittance area apertures 29 leading to central bore aperture 30 of passageway 22. Bore aperture 30 is, as seen in FIGURE 2, in line and thus in registry with carburetor bore 12 and intake bore 31 of the intake manifold 20. Gaskets G are provided as shown.

In referring to FIGURES 3 and 4, it will be seen that the passageways 28 communicate with the interior bores 33 of respective valve seats 34 of the respective valves 35. Valve seats 34 are integrally made a part of base 36 of valve housing 37. Mounted to opposite base extremities of the valve housing 37 are ears 38 and 39 which accommodate the return springs 40 and 41 with the lower extremities of the latter at 42 and 43 looping through gear apertures 44 and 45. Opposite extremities 46 and 47 of springs 40 and 41 loop through apertures 48 and 49 of extension ears 50 and 51 of valve slide plate 52. Valve slide plate 52 may be made of sandwich or other construction and, in any event, is disposed between partitions 53 and 54 and retained by retainer plates 55 and 56 of valve housing 37, so as to be capable of sliding up and down in the slots 57 and 58 formed by plates 55, 56, partitions 53, 54, and by housing backing 60, see FIGURE 1.

Valving housing 37 forms a part of a larger unit, to-wit, an auxiliary air valve structure 61 which includes an air filter encasement 62 having screen mesh 63 and air filter 64 as shown in FIGURE 6. The air is received as illustrated in FIGURE 6 at arrow A; it proceeds through the filter 64 and through screen 63 to enter into the valve housing 37 proper through aperture 65 and the screen 63 covering the same. When the valve gates 66 of valves 35 are upwardly drawn from their valve seats 34, then air proceeds downwardly through the valve seats 34 which communicate with passageways 28 in the passage plate 22. This facility is accomplished through the securement of the valve seats 34 to base 36 and the communication of the bores 33 of the latter with passageways 28. Slide plate 52 includes a slot 66 as seen for the reception of back 60. The valve gate 66 may be welded or otherwise secured to slide plate 52 so that as slide plate 52 is translated upwardly and downwardly, the respective valves 34 will open and close, successively. The valves are preferably needle valves and of a tapered form, as indicated, so that the higher the valve's gates are moved upwardly, the progressively greater becomes the air flow through the valves, this in a preferable linear relationship so that an increment of movement of a respective valve gate will cause a progressive, proportional incremental change in the volume of air passage to the valve through the passageway. Of course, the intake manifold will supply sufficient reduced pressure so that the auxiliary air will be drawn through the filter of air valve structure 61, through the valve 35 and into the internal combustion engine below the carburetor.

The structure by which the slide plate 52 is moved up and down so as to appropriately meter and regulate auxiliary air flow to the intake manifold will now be discussed.

Affixed to slide 80 are brackets 69 which, by their joint pivot pin 70 pivotally retain cam ramp 71, the latter preferably comprising a T-section as is illustrated in FIGURE 6. Cam follower roller 72 in FIGURE 6 is journaled by pivot axle 73 which is secured to slide plate 52 as indicated. Thus, as the cam follower roller 72 is made to roll up and down ramp 71, then the latter will produce the vertical movement of slide plate 52 and, since valve gates 66 are fixedly secured to the latter, the valve gates will progressively be opened above valve seats 34. The angle of inclination of cam ramp 71 may be pre-set by the inclusion of adjustment screw 72', lock nuts 73 being provided to secure screw 72 to cam ramp 71 to suitable aperture 74. The end of adjustment screw 72 may engage a suitably configured stop plate 75 which itself is securely affixed to passage plate 72. Springs 40, 41 and cam follower roller 72, with screw 72 abutting plate 75, keep ramp 71 in position. The incline of cam ramp 71 may be adjusted by the releasing of the lock nuts 73 and by turning the adjustment screw 72' appropriately.

Brackets 69 in FIGURE 9 are mounted to include the leg 78 of cam ramp T 71, and the latter is pivotally secured to the brackets 59 by pivot pin or rivet 79. It will be noted that the slide 80 is shouldered at 81 and 82 to accommodate the slide guide 83 within which it is slideably implaced. Thus, translation of slide 80 within guide 83 will effect a translation to the right or to the left, see FIGURE 1 of cam ramp 71 and, accordingly, and by virtue of the action of cam roller follower 72, a vertical up-and-down movement of valve plate 52 will result. The translational motion of the slide 80 is accomplished by auxiliary valve control rod 93 the L-configured extremity 94 of which is secured through aperture 95 of upstanding mounting tab 96 by means of cotter 97 and friction mounted fiber washers 98. Other types of conventional attachments for the rod 93 may be employed here to secure the same to the slide 80.

To complete the structure, a cover plate 100 may be included for the air filter enclosure as is seen in FIGURE 2. Cover plate 100 is secured by pivot screw 101 to the tab 102 of the structure 37. Coupling of auxiliary air valve control rod 93 to the accelerator rod 19 is made by conventional clamp 103 having tightening screws 104.

The deflection structure for obtaining increased atomization and vaporization of raw fuel as might have passed through the carburetor will now be discussed. The fuel-air deflection mixer structure is shown in FIGURE 5 and is designated as 108; it includes plural spiders 109 each having outwardly extending radial fingers 110. The spiders may be secured together by nut and bolt attachments 111 and by spacers 112' of sufficient dimension as not to restrict unduly the throat of the fuel-air passageway. The fingers will be suitably displaced so that a maximum mixing effect in the form of circuitous fuel vapor and air movements within this portion of the intake manifold will take place. This auxiliary, fuel-air deflection mixer structure 108 is preferably simply set into the structure by means of the ears 112 of mounting strap 113, the ears 112 being retained in recessed shoulder slots 113 and 114 in passage plate 22, see FIGURE 5.

The structure illustrated in FIGURES 1–10 operates as follows. It will be noted that a pushing upon accelerator pedal X, and hence upon the accelerator rod 19, will accomplish a clockwise rotational movement of lever member 15 and butterfly valve rod 14, thus tending to open the valve and thereby increase the speed of the engine. This will be accompanied by a simultaneous translation to the left of cam ramp 71 upon which cam roller follower 72 rides. This cam action causes a rising of valve plate 52 to which valve gates 66 are affixed. The consequent raising of valve gates pursuant to the upward movement of plate 52 opens valves 35 simultaneously, and in a progressive manner, so as to cause more and more air to flow from the outside through auxiliary filter 64 and through aperture 65, down through the valve seats 34 and into passageways 28, leading ultimately to aperture admittance areas 29 and from thence into the bore area leading to the intake manifold 30. This fresh outside air coming into the carburetor-manifold passageway at spaced areas of communication will be mixed with the fuel air mixture proceeding down through the carburetor 12 and the two further mixed together and a substantial portion of any raw fuel present vaporized by the included fuel-air deflection mixer 108, shown in FIGURES 4 and 5, so that an optimum portion of air relative to vaporized fuel enters into the intake manifold. Now it is important to note that some increased turbulence will be produced by the incoming air through passageway 28 which mixes with the fuel-air and raw gas mixture proceeding from the carburetor; however, the additional mechanical mixer should be supplied in order to increase further the homogeneous nature of the fuel-air mixture and especially to break up the raw gas present before the fuel-air mixture enters into the intake manifold of the engine.

Adjustments as to rate of valve opening relative to valve 35 with respect to accelerator rod translations, see rod 19 in FIGURE 1, may be made by use of the adjustment screw 72, by use of a tachometer of any combustion analysis device, which determines the angle of inclination of cam ramps 71 which further determines rate of valve opening for a particular incremental change in accelerator displacement. Pre-calibration at the factory is, hence, unnecessary. Accordingly, the rate of increase of auxiliary air injection in response to accelerations and decelerations of the automobile engine can be controlled as desired.

FIGURES 11 and 12 indicate that the auxiliary air mechanism may be used not only with one barrel carburetors as in FIGURES 1 and 3 but also plural barrel carburetors, as is shown in connection with the two barrel carburetors seen in FIGURES 11 and 12. Here the auxiliary air valve structure 37 is provided with plural valves 35' all of which will be coupled via appropriate slide plate (not shown) corresponding to slide plate 52 in FIGURE 3, so that the valves will be moved up and down simultaneously to accomplish the necessarily necessary porting of air into the carburetor barrels as at barrel bores 30' of the passage plate 22' in FIGURE 12. Passageways 28' are similar to passageways 28 in FIGURE 4.

In both embodiments of the invention, that is the embodiments shown in FIGURES 1–10 and FIGURES 11 and 12, it is highly preferred that air enter into both sides of the carburetor barrel, this to insure proper mixing of the air from the auxiliary source with the fuel-air mixture of the carburetor.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. An auxiliary air injection structure for operative disposition between the carburetor and intake manifold of an internal combustion engine, said carburetor being provided with actuatable means for selectively, progressively opening and closing said carburetor, and said auxiliary air injection structure including, in combination: a passage plate constructed for disposition between said carburetor and said intake manifold, said passage plate including a transverse aperture constructed for communicative disposition between said carburetor and said intake manifold and at least one passageway disposed at least in part longitudinally therethrough and transversely intersecting said aperture, air accessible valve means for selectively and progressively opening and closing said passageway, means for progressively opening and closing said valve means, and means constructed for coupling said actuatable means with said valve opening and closing means to permit said valve means to allow air to be conducted through said passageway of said passage plate in accordance with the operating condition of said carburetor; and wherein said valve means includes valve gate means, valve slide plate mounting said valve gate means, and a cam follower affixed to said slide plate, and wherein said means for progressively opening and closing said valve means also includes a cam ramp rectilinearly translationally coupled by said coupling means to said actuating means and engaging said cam follower for progressively moving in translational displacements said slide plate and, hence, said valve gate means in accordance with the operating condition of said carburetor.

2. An auxiliary air injection structure for operative disposition between the carburetor and intake manifold of an internal combustion engine, said carburetor being provided with actuatable means for selectively, progressively opening and closing said carburetor, and said auxiliary air injection structure including, in combination: a passage plate constructed for disposition between said carburetor and said intake manifold, said passage plate including a transverse aperture constructed for communicative disposition between said carburetor and said intake manifold and at least one passageway disposed at least in part longitudinally therethrough and transversely intersecting said aperture, air accessible valve means for selectively and progressively opening and closing said passageway, means for progressively opening and closing said valve means, and means constructed for coupling said actuatable means with said valve opening and closing means to permit said valve means to allow air to be conducted through said passageway of said passage plate in accordance with the operating condition of said carburetor; and wherein said passage plate aperture comprises a bore disposed in registry communication with said carburetor and said intake manifold, and wherein there is included plural passageway means longitudinally disposed through said passage plate and communicating with said aperture at spaced areas thereof.

3. An auxiliary air injection structure for operative disposition between the carburetor and intake manifold of an internal combustion engine, said carburetor being provided with actuatable means for selectively, progressively opening and closing said carburetor, and said auxiliary air injection structure including, in combination: a passage plate constructed for disposition between said carburetor and said intake manifold, said passage plate including a transverse aperture constructed for communicative disposition between said carburetor and said intake manifold and at least one passageway disposed at least in part longitudinally therethrough and transversely intersecting said aperture, air accessible valve means for selectively and progressively opening and closing said passageway, means for progressively opening and closing said valve means, and means constructed for coupling said actuatable means with said valve opening and closing means to permit said valve means to allow air to be conducted through said passageway of said passage plate in accordance with the operating condition of said carburetor; and wherein said passage plate aperture comprises a bore disposed in communication with the interiors of said carburetor and said intake manifold, said passage plate also including plural passageways, and said valve means including plural valve gates for selectively and progressively opening and closing said passageways, said passageways communicating with said passage plate bore at mutually spaced areas.

4. In combination, a passage plate constructed for disposition between the carburetor and intake manifold of an internal combustion engine, said passage plate including a transverse aperture registerable with and between said intake manifold and said carburetor and a metered passageway transversely intersecting said aperture, and a fuel-air deflection mixer structure keyed to said passage plate and operatively disposed beyond the intersection of said passageway with said aperture, to receive and pass the fuel-air stream emanating therefrom.

5. Fuel-air mixer structure for insertion between the carburetor and intake manifold of an internal combustion engine, said structure including, in combination, plural spiders each having radial fingers, said spiders being displaced with respect to each other, and means for securing said spiders together to form a circuitous, fuel air homogenizing region for uniformly mixing fuel and air prior to passage thereof into said intake manifold.

6. Fuel-air mixer structure for insertion between the carburetor and intake manifold of an internal combustion engine, said structure including, in combination, plural cup-configured spiders each having radial fingers, said spiders being displaced with respect to each other, means for securing said spiders together to form a circuitous, fuel-air homogenizing region for uniformly mixing fuel and air prior to passage thereof into said intake manifold, and means for keying at least one of said spiders at its upper margins to an external member.

References Cited by the Examiner
UNITED STATES PATENTS

| | | | |
|---|---|---|---|
| 1,029,810 | 6/12 | La Mont. | |
| 1,479,560 | 1/24 | Stockman | 123—119 |
| 1,614,543 | 1/27 | Brown | 123—119 |
| 2,126,071 | 8/38 | Weiertz. | |
| 2,153,350 | 4/39 | Stimac. | |
| 2,639,230 | 5/53 | Lefebre | 123—141 X |

KARL J. ALBRECHT, *Primary Examiner.*